(No Model.)
J. H. SHUFELT.
ROAD CART.
No. 367,854. Patented Aug. 9, 1887.
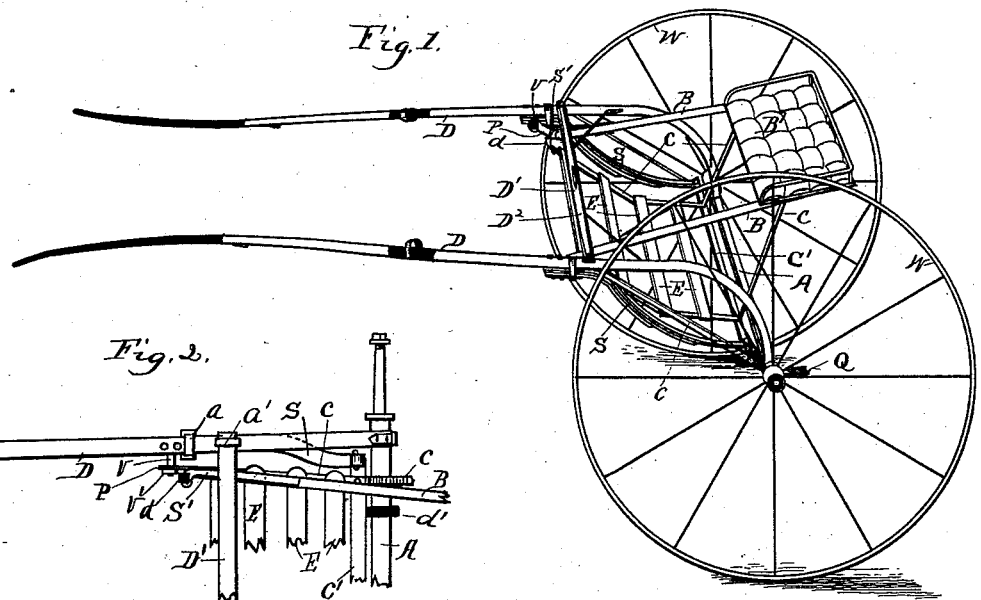
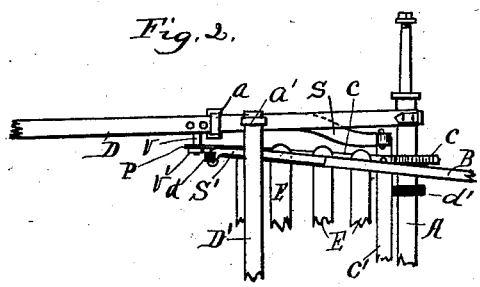
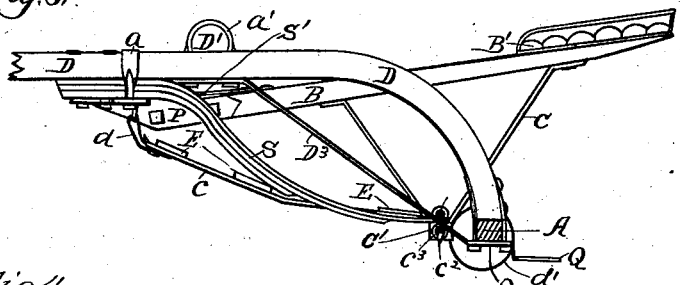
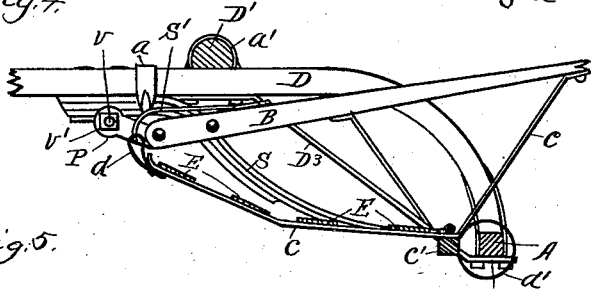
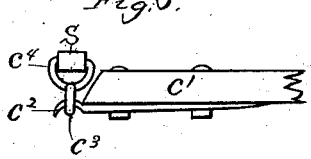
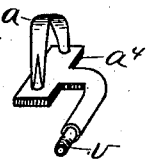
Witnesses.
Thos H Hutchins
Thos J Hutchins
Inventor.
John H Shufelt.
N. PETERS, Photo-Lithographer, Washington, D. C.

(No Model.)
J. H. SHUFELT.
ROAD CART.
No. 367,854. Patented Aug. 9, 1887.
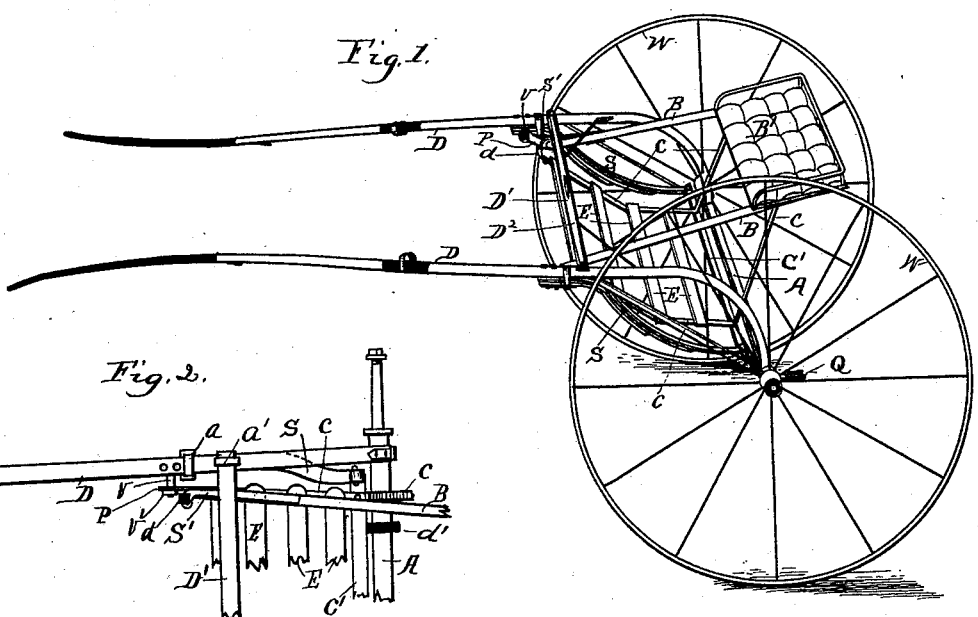
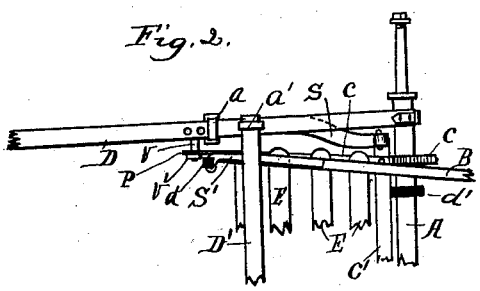
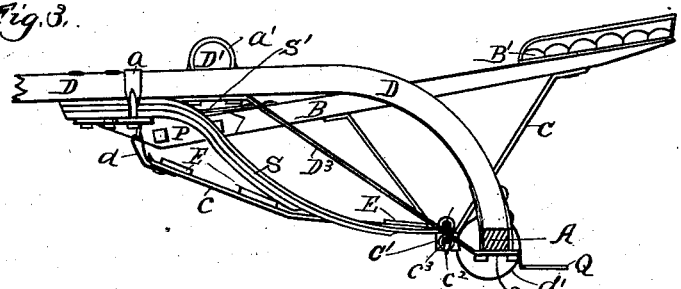
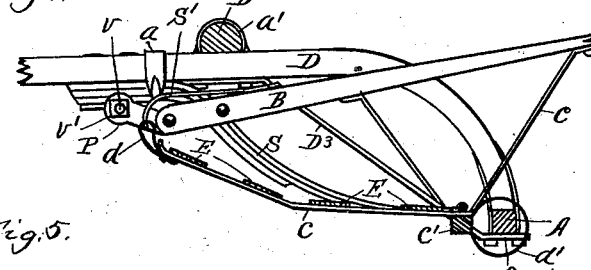
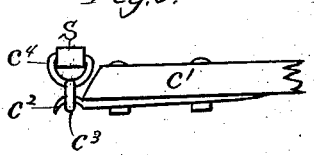
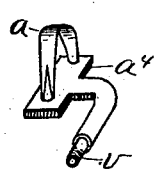
Witnesses.
Thos H Hutchins.
Wm J Hutchins.
Inventor,
John H Shufelt.
N. PETERS, Photo-Lithographer, Washington, D. C.

UNITED STATES PATENT OFFICE.

JOHN H. SHUFELT, OF JOLIET, ILLINOIS.

ROAD-CART.

SPECIFICATION forming part of Letters Patent No. 367,854, dated August 9, 1887.

Application filed May 2, 1887. Serial No. 236,898. (No model.)

*To all whom it may concern:*

Be it known that I, JOHN H. SHUFELT, a citizen of the United States of America, residing at Joliet, in the county of Will and State of Illinois, have invented certain new and useful Improvements in Road-Carts, of which the following is a specification, reference being had therein to the accompanying drawings.

This invention relates to certain improvements in road-carts, which improvements are fully set forth and explained in the following specification and claims, reference being had to the accompanying drawings, and the letters and figures thereon, making a part of this specification, in which—

Figure 1 is a perspective view of the road-cart complete. Fig. 2 is a detailed top plan view showing a portion of the cart. Fig. 3 is a side view of the cart having the wheels removed and showing the axle in cross-section and a portion of a thill. Fig. 4 is a vertical longitudinal sectional view of the cart on a line near one side, having portions broken away and having the opposite wheel removed. Fig. 5 is a rear view of one end of the spring-bar, showing the manner in which it is shackled to the rear free end of one of the springs; and Fig. 6 is a perspective view of one of the spring-clips of the cart.

Referring to the drawings, A represents the axle, which is preferably made of steel, and has arranged thereon a traveling wheel, W W, at each end, as shown in Fig. 1.

D D represent the thills, which are bent in the form shown in Fig. 1, and are clipped to axle A, one near each traveling wheel W, by means of clips, as shown at $o$ in Figs. 3 and 4. $D^3$ $D^3$ are braces arranged to connect the body of the thills with the said clips $o$, as shown, for the purpose of increasing the strength of the thills and preserve their bent form when under strain.

D' is a cross-bar arranged across and connecting the thills D D and is secured to them by means of clips $a'$, as shown in Figs. 2, 3, and 4.

$D^2$ is a whiffletree, to which a horse may be attached to draw the cart, and is centrally and pivotally secured to the cross-bar D', as shown in Fig. 1.

S S represent a pair of leaf-springs, one arranged under each thill in such manner that their free lower ends are near the forward side of the axle A, and are secured to the thills D D by means of the clips $a\,a$ and bolts, as shown in Figs. 1, 2, 3, and 4.

The cross-plates $a^4$ of clip $a$ are formed with integral side projecting studs, $v\,v$, which project inwardly from the springs S S in such manner as to be opposite and face each other.

C' represents a spring-bar arranged near the forward side of axle A and parallel therewith, and has secured to its lower side at each end a hooked plate, $C^2$, for connecting it by means of the shackle-links $C^3$ $C^4$ with the lower free ends of the springs S S, and supports the rear side of the foot-rest, as shown in Figs. 1, 2, 4, and 5.

B B represent a pair of seat-bars, each having secured to its inner end an eye-plate, P P, which plates are pivotally arranged, respectively, on the studs $v\,v$, and held thereon by means of nuts screwed on the extending ends of said studs; or keys may perform said service, if desired. The rear extending ends of said seat-bars converge toward each other and support a seat, B', as shown in Figs. 1 and 3. S' S' are a pair of springs secured to the upper side of the forward ends of said seat-bars and extend slightly beyond said bars, and are provided with elongated eyes, through which the straps $d\,d$ pass to connect said springs with the forward side of the foot-rest.

C C are flat metal bars arranged one below each seat-bar and formed as shown in Figs. 3 and 4, and connected at their forward ends by means of straps $d\,d$, with the extending free ends of springs S' S', and resting at their angle at near their center on the spring-bar C', and extending rearward and upward from said spring-bar to form braces and a support for the rear ends of the seat-bars, as shown in said figures. Said bars C C are provided with a series of slats, E, extending from the spring-bar C' to near the forward ends of said bars, and form a foot-rest upon which to rest the feet.

$d'\,d'$ are straps secured to the spring-bar, one near each end, and are arranged to encircle the axle for the purpose of permitting the spring-bar to have vertical movement only within certain limits.

Q represents a step for resting the foot on when mounting the cart, and is formed integral with the plate of one of the clips $o$ under axle A, and is arranged to project rearward from the axle, as shown in Figs. 3 and 4.

The body parts of springs S S are formed with a double lateral curve, as shown in Fig. 2, so their rear parts will be between the thills and not be engaged thereby to interfere with their operation. The downward and lateral curve of the springs S S not only gives a free easy vertical movement to the person on the seat, but relieves the seat from the jerking horse motion as well. By means of such construction the seat and rear side of the foot-rest are supported on the free ends of the springs S S through the medium of the spring-bar C', and the forward part of the foot-rest is connected with the springs S' S' through the medium of the straps $d\ d$, so that the feet are relieved from the sharp stinging sensation given them when the foot-rest is supported on a rigid bearing, and the foot-rest is given the benefit of spring-support as well as the seat.

Having thus described my invention, what I claim as new, and desire to secure by Letters Patent, is as follows, to-wit:

1. In the road-cart described, in combination with the thills D and axle A, the springs S S, spring-bar C', for connecting the free ends of said springs adjacent to the forward side of said axle, springs S' S', straps $d'\ d'$, seat-bars B B, and bars C C, having the cross-slats E, forming the foot-rest, substantially as and for the purpose set forth.

2. In the road-cart described, the foot-rest consisting of the bars C C and cross-slats E, in combination with the spring-bar C' and springs S S and S' S' and straps $d\ d$, substantially as set forth.

3. In the road-cart described, and in combination with the thills and axle thereof, arranged as shown, the seat-bars B B, pivotally attached at their forward ends to the studs $v\ v$ on the inner sides of the thills, and having a seat, B', secured to their rear converging ends, springs S S, spring-bar C', connecting the free ends of said springs, and braces C C, for connecting said spring-bar and seat-bars, substantially as and for the purpose set forth.

4. In the road-cart described, and in combination with the thills and axle thereof, the seat-bars B B, pivotally attached at their inner ends to the inner sides of the thills, springs S S, having their forward ends secured to the under side of the thills and their free ends terminate adjacent to the forward side of said axle, spring-bar C', for connecting the free ends of said springs, braces C C, for connecting said spring-bar and seat-bars, springs S' S', arranged on the forward ends of said seat-bars, and foot-rest, consisting of the bars C C, cross-slats E, and straps $d\ d$, substantially as and for the purpose set forth.

5. In the road-cart described, and in combination with the springs S S and S' S', the foot-rest thereof, yieldingly supported by said springs through the medium of straps $d\ d$, and the spring-bar C', substantially as and for the purpose set forth.

6. In the road-cart described, in combination with the springs S S and S' S', the foot-rest thereof, yieldingly supported by said springs, as shown, and the seat B', supported on the spring-bar C', and having its supporting-bars B B pivotally secured to studs $v\ v$, substantially as and for the purpose set forth.

JOHN H. SHUFELT.

Witnesses:
   THOS. H. HUTCHINS,
   T. L. LONGLEY.